US008281407B2

(12) United States Patent
Ryan, Jr. et al.

(10) Patent No.: US 8,281,407 B2
(45) Date of Patent: Oct. 2, 2012

(54) IN-LINE DECRYPTION DEVICE FOR SECURELY PRINTING DOCUMENTS

(75) Inventors: Frederick W. Ryan, Jr., Oxford, CT (US); Scott F. Armstrong, Toronto (CA)

(73) Assignee: Pitney Bowes Inc., Stamford, CT (US)

( * ) Notice: Subject to any disclaimer, the term of this patent is extended or adjusted under 35 U.S.C. 154(b) by 966 days.

(21) Appl. No.: 12/330,838

(22) Filed: Dec. 9, 2008

(65) Prior Publication Data

US 2010/0142706 A1  Jun. 10, 2010

(51) Int. Cl.
  *G06F 17/30*  (2006.01)
  *H04N 7/16*  (2011.01)
(52) U.S. Cl. .................. 726/26; 726/31; 726/32; 726/33
(58) Field of Classification Search .......................... None
  See application file for complete search history.

(56) References Cited

U.S. PATENT DOCUMENTS

| | | | |
|---|---|---|---|
| 5,583,779 A | | 12/1996 | Naclerio et al. |
| 5,606,507 A | * | 2/1997 | Kara .............................. 705/408 |
| 5,684,949 A | * | 11/1997 | Naclerio ........................... 726/2 |
| 5,889,860 A | * | 3/1999 | Eller et al. ....................... 705/51 |
| 6,996,235 B2 | | 2/2006 | Foth |
| 7,072,473 B2 | | 7/2006 | Foth |
| 7,113,300 B2 | | 9/2006 | Strobel et al. |
| 7,191,158 B2 | * | 3/2007 | Ogg et al. ...................... 705/408 |
| 2002/0056988 A1 | * | 5/2002 | Patton .............................. 283/71 |
| 2003/0012379 A1 | * | 1/2003 | Foth ............................... 380/243 |
| 2006/0259444 A1 | * | 11/2006 | Obrea et al. ................... 705/401 |
| 2006/0271500 A1 | * | 11/2006 | Obrea et al. .................... 705/76 |

* cited by examiner

*Primary Examiner* — William Powers
(74) *Attorney, Agent, or Firm* — Brian A. Lemm; Charles R. Malandra, Jr.; Steven J. Shapiro

(57) ABSTRACT

A media content printing method that includes storing encrypted media content data representing media content in a computing device, generating a file of print commands that include the encrypted media content data non-encrypted commands for printing the media content based on the encrypted media content data, and sending the file of print commands to an intermediate device that stores a cryptographic key. The method further includes sending the non-encrypted commands to a printing device, determining if the media content is authorized to be printed, and decrypting the encrypted media content data in the intermediate electronic device that corresponds to the authorized media content to produce decrypted media content data. The decrypted media content data is sent to the printing device for printing the media content based on the non-encrypted commands and the decrypted media content.

17 Claims, 2 Drawing Sheets

IN-LINE DECRYPTION DEVICE FOR SECURELY PRINTING DOCUMENTS

FIELD OF THE INVENTION

The present invention relates to a system and method for printing images, and in particular to a system and method for securely printing an image that is securely stored in encrypted, digital form.

BACKGROUND OF THE INVENTION

There are a number of applications and systems where, for security and/or controls purposes, it is desirable to store valuable media contents, e.g., images, text and the like, in an encrypted, digital form. For example, access to copyrighted visual works, such as photographs or drawings, is often controlled by storing them in an encrypted digital form and permitting them to be decrypted and printed only with proper authorization. Another type of valuable image which must be protected and controlled is a postal indicium that is printed by a postage printing/metering system as evidence of postage. In addition, it is also often desirable to, with proper authorization, be able to print such images using a standard printer. The problem, however, is that in order to be properly printed, the images must first be successfully decrypted using an appropriate cryptographic key or keys, and once decrypted on the computer system on which they are stored, the images are accessible and therefore vulnerable to capture and improper use, such as unauthorized reprinting and/or modification.

SUMMARY OF THE INVENTION

The present invention alleviates the problems associated with the prior art and provides a method and system for securely printing media content, e.g., images, text and the like, such that the media content is not accessible on a computer system and therefore not vulnerable to capture and improper use.

According to the present invention, the media content is stored in a computer system only in encrypted form. When printing of the media content is desired, the computing device generates a file of print commands, preferably Printer Control Language (PCL) commands, which include the encrypted media content along with non-encrypted commands associated with printing the media content. The file of print commands is sent to a secure intermediate electronic device through a first USB channel and the intermediate electronic device is operatively coupled to a printing device through a second USB channel.

The intermediate electronic device sends the non-encrypted commands to the printing device through the second USB channel and determines whether printing the media content that corresponds to the encrypted media content is authorized. If printing of the media content is authorized, the intermediate electronic device decrypts the encrypted media content using a cryptographic key stored in the intermediate electronic device and sends the decrypted media content to the printing device for printing. Thus, the cryptographic key required to decrypt the media content is securely stored in the intermediate electronic device, making it difficult to obtain for improper use. Furthermore, the media content is never accessible on the computer system in decrypted form, and therefore is not vulnerable to being captured for improper use.

Therefore, it should now be apparent that the invention substantially achieves all the above aspects and advantages. Additional aspects and advantages of the invention will be set forth in the description that follows, and in part will be obvious from the description, or may be learned by practice of the invention. Moreover, the aspects and advantages of the invention may be realized and obtained by means of the instrumentalities and combinations particularly pointed out in the appended claims.

BRIEF DESCRIPTION OF THE DRAWINGS

The accompanying drawings illustrate presently preferred embodiments of the invention, and together with the general description given above and the detailed description given below, serve to explain the principles of the invention. As shown throughout the drawings, like reference numerals designate like or corresponding parts.

DESCRIPTION OF THE PREFERRED EMBODIMENTS

Figure 1:
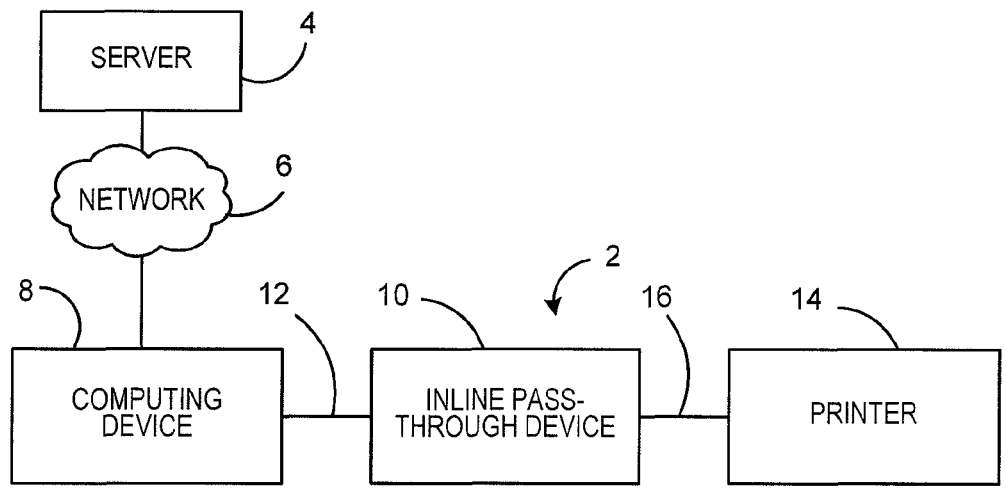
FIG. 1 is a block diagram of a system for printing images according to one embodiment of the present invention.

FIG. 1 is a block diagram of a system 2 for printing media content that is securely stored in an encrypted, digital form according to one embodiment of the present invention. As seen in FIG. 1, the system 2 includes a computing device 8, which may be, without limitation, a PC or another suitable device, that is operatively coupled to a secure inline pass-through device 10, described in greater detail below, through a first communications channel 12, such as, without limitation, a USB channel. The inline pass-through device 10 is operatively coupled to a standard printer 14, such as, without limitation, a standard ink-jet or laser printer, through a second communications channel 16, such as, without limitation, a USB channel. Optionally, the inline pass-through device 10 and printer 14 could be incorporated into a single unit, or the inline pass-through device 10 could be implemented as software within a printing device. Optionally, the computing device 8 may be connected to a network 6, such as, for example, the Internet or the like, which in turn is connected to a remote server 4. The computing device 8 can communicate with the server 4, via the network 6, to conduct online transactions and the like.

The computing device 8 stores media content, e.g., images, text and the like, therein in an encrypted, digital form. In particular, the computing device 8 stores encrypted media content data for different media content. In this form, each of the media content is protected because if the data (encrypted) were to be used in a print operation, the resulting printed media content, e.g., image or text, would not resemble the actual original media content, but instead would be mottled in appearance. The encrypted media content data for an image may be, for example, an encrypted bit map. As will be appreciated, each encrypted media content may be created by encrypting the original media content using any suitable encryption algorithm (such as, without limitation, an appropriate symmetric encryption algorithm like the AES algorithm) and an associated key or keys (such as, without limitation, an appropriate symmetric encryption key). As will also be appreciated, the original media content may be obtained from the encrypted media content by decrypting the encrypted media content using the appropriate key or keys (e.g., the same symmetric encryption key). According to an aspect of the present invention and as described in greater detail below, media content data decryption is performed in a secure manner by the inline pass-through device 10.

Figure 2:
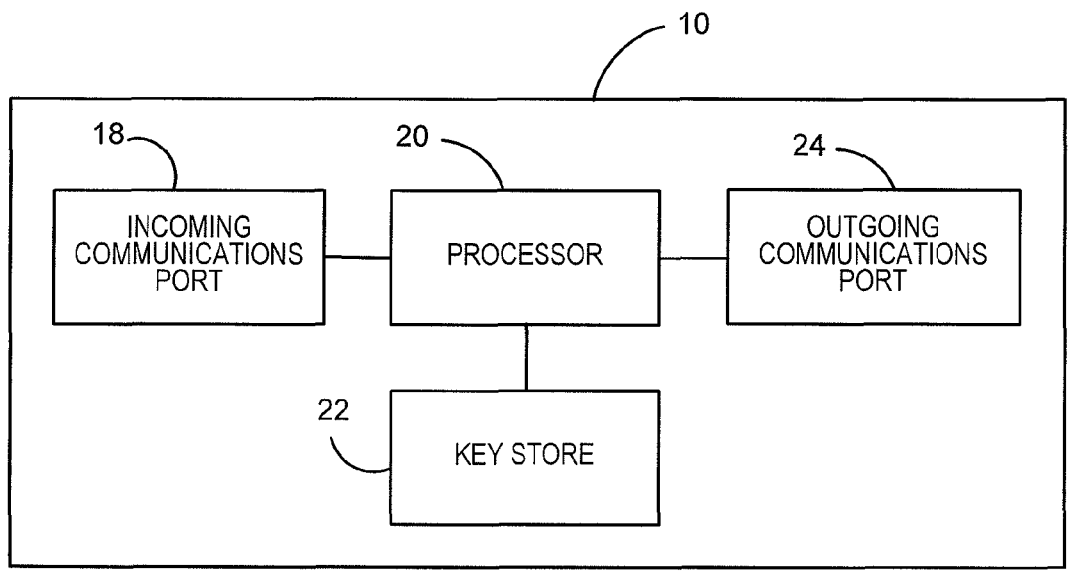
FIG. 2 a block diagram of one particular embodiment of the inline pass-through device of the system of FIG. 1.

FIG. 2 is a block diagram of the inline pass-through device 10 according to one particular embodiment which, as described in greater detail herein, decrypts encrypted media content data so that the original media content can then be printed as part of a document. The inline pass-through device 10 includes an incoming communications port 18 for receiving commands (described in greater detail elsewhere herein) from the computing device 8 over the communications channel 12. The incoming communications port 18 is operatively coupled to a processor 20, such as, without limitation, a microprocessor, a microcontroller or some other suitable processing device. The processor 20 is operatively coupled to a secure key store 22, e.g., memory device or the like, which stores one or more cryptographic keys which are used by the processor 20 to decrypt the encrypted media content data sent from the computing device 8. As will be appreciated, the particular cryptographic keys that are stored in the key store 22 are the keys that are necessary to decrypt the encrypted media content data stored by the computing device 8 as described above. For example, the keys may be the same symmetric encryption key or keys used to generate the encrypted media content data, or alternatively, public key asymmetric cryptography may be employed. Key store 22 also includes a serial number which uniquely identifies the inline pass-through device 10 and a database of transactions. The database of transactions includes a counter that indicates the number of times media content has been successfully decrypted, based on a unique content identifier provided with the media content (as described further below). In addition, the processor 20 is operatively coupled to the outgoing communications port 24 which in turn is operatively coupled to the communications channel 16. As described in greater detail elsewhere herein, the processor 20 is adapted to generate and send to the printer 14 commands for printing documents including the media content that is securely stored in the computing device 8 in encrypted, digital form.

The inline pass-through device 10 may be made secure using any of a number of known techniques for protecting the security of the keys stored therein. For example, one or more tamper prevention mechanisms may be employed in the inline pass-through device 10 to protect the device, and thus the keys stored therein, from an attacker.

Figure 3:
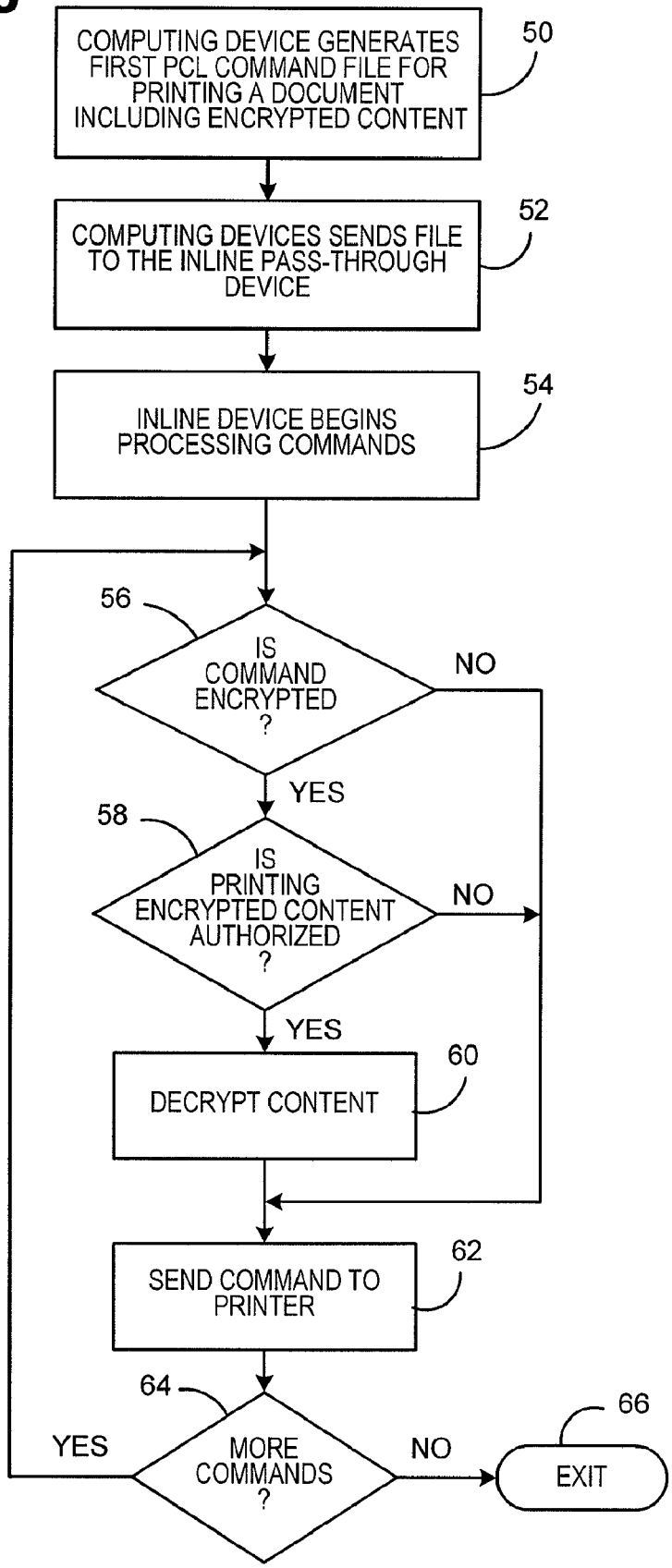
FIG. 3 is a flowchart illustrating a method of printing a document including an image using the system of FIG. 1 according to one embodiment of the invention wherein the image is stored in an encrypted, digital form.

FIG. 3 is a flowchart illustrating a method of printing a document including media content using the system 2 according to one embodiment of the invention. The method begins at step 50, where the computing device 8 generates a file of print commands, preferably in the form of printer control language (PCL) commands, for printing a document that includes commands for printing identified media content that is stored by the computing device 8 in encrypted form. The identified media content may be either temporary, e.g., the result of an on-line transaction with the server 4 via network 6, or persistent, e.g., downloaded and stored for future use. The encrypted media content is preferably received from a third party which is either an owner of the media content or a broker acting on behalf of the owner, e.g., a copyrighted image broker. For example, the media content may be a postage indicium that evidences payment of postage. The computing device 8 can request one or more indicium from the server 4, which generates and encrypts the indicium and downloads it to the computing device 8 for printing. The encrypted content includes header information which contains instructions for processing the encrypted content and a body section which contains the encrypted identified media content. The instructions include the serial number of the device for which the content has been encrypted, a unique content identifier of the content and a counter indicating how many times the encrypted media content may be decrypted and printed. Preferably, this header information is implemented as a command or series of commands that would normally be ignored by a standard printer, e.g., a series of cursor movements which follow a path that return the cursor to its position prior to moving along the path, or command embedded in comments. The file of commands may optionally also include commands for printing other portions of a document along with the media content, such as other text or images. At step 52, the computing device 8 sends the generated commands to the inline pass-through device 10 through the communications channel 12.

At step 54, the inline pass-through device 10 begins processing the commands received from computing device 8. At step 56, a determination is made in the inline pass-through device 10 as to whether or not the current command being processed includes encrypted media content. Any commands that do not include encrypted media content are sent to the printer 14 via communication channel 16 at step 62. It should be noted that this determining step allows standard print files that do not include encrypted media content to be sent to the printer through the inline pass-through device 10 without alteration.

If, at step 56, it is determined that the command includes encrypted media content, a determination is made at step 58 whether printing of the encrypted media content is authorized. The determination is based upon the header information included in the encrypted contents and the database of transactions stored in the inline pass-through device 10. The encrypted content is authorized for printing only if the serial number in the content matches the device serial number and the content identifier in the header has not been previously decrypted more than the counter in the header. The latter is determined by comparing the counter in the header with the successful decryption counter for the unique content identifier stored in the database of transactions. For example, the header for a postage indicium would include a serial number of the inline pass-through device 10, a unique identifier for the postage indicium and a counter with a value of one, indicating that the indicium should be printed only a single time. Thus, in this example, the step 58 determination would include a determination as to whether the identified encrypted media content has been previously printed. Alternatively, in other embodiments, each stored encrypted media content is able to be successfully printed a predetermined number of times (i.e., limited reprints of a copyrighted image). Thus, in those embodiments, the inline pass-through device 10 keeps track of the number of times that each stored encrypted media content has been printed in the decryption counter of key store 22, based on the unique identifier for each encrypted media content, and the step 58 determination would include a determination as to whether the identified encrypted media content has already been printed the maximum number of times. If at step 58 it is determined that the encrypted media content is authorized for printing, the encrypted media content is decrypted at step 60 and then sent to the printer 14 via communication channel 16 at step 62. If, at step 58, it is determined that the encrypted media content is not authorized to be printed, the encrypted media content is sent directly to the printer 14 via communication channel 16 at step 62 without decrypting. Sending the encrypted media content directly to the printer results in the printing of random content, e.g. a mottled image, rather than the original unencrypted media content.

Following step 62, the inline pass-through device determines if there are more commands to process. If more commands have been received, processing continues at step 56. It should be noted that these additional commands could include encrypted and/or unencrypted content If there are no more further commands to process (e.g., if an end of file command is received), processing terminates at step 66.

Thus, in the system 2 and using the method of FIG. 3, encrypted media content, e.g., an identified image or text, that is securely stored in an encrypted fashion is able to be securely printed by a standard printer by decrypting encrypted media content data for printing the media content inline so that the decrypted media content data is never present on the computing device 8. In addition, as the cryptographic key or keys used to decrypt the encrypted media content data are protected in the inline pass-through device 10, the presence of the printed original media content in a document proves that the inline pass-through device 10 was used to print the original media content.

As a further level of security, the encrypted media content data may be digitally signed by the computing device 8 with a private key that is a pair to a public key stored in the key store 22 of the inline pass-through device 10. Alternatively, a message authentication code (MAC) based upon symmetric key cryptography may be used. In this embodiment, the processor 20 of the inline pass-through device 10 will proceed to decrypt the encrypted media content data as described in step 58 and cause the media content to be printed as described in step 60 to 64 only if the processor 20 is able to verify the digital signature of the encrypted media content data using the stored public key or the MAC using the symmetric key.

While the above description was provided with respect to printed content, e.g., images or text, the present invention is not so limited and can be utilized with other types of media content as well. For example, the media content could also include audio or video files that are being sent to an audio or video device for playback. Thus, the printer 14 of FIG. 1 would be replaced by an audio device or video device, depending on the application. Portions of the audio or video file could be encrypted, which require the inline pass-through device 10 to decrypt. If the inline pass-through device 10 is not provided, or if the content is not properly decrypted by the inline pass-through device 10, the result would be audio or video that while intelligible, would have lower fidelity or noisy outputs. Such an application might be useful for previewing audio or video prior to purchase.

While preferred embodiments of the invention have been described and illustrated above, it should be understood that these are exemplary of the invention and are not to be considered as limiting. Additions, deletions, substitutions, and other modifications can be made without departing from the spirit or scope of the present invention. Accordingly, the invention is not to be considered as limited by the foregoing description but is only limited by the scope of the appended claims.

What is claimed is:

1. A method for printing media content, the media content being stored in encrypted form in a computing device, the method comprising:
   receiving, from the computing device, at an intermediate device located between the computing device and a printing device, a file of print commands, the file of print commands including the media content in encrypted form and non-encrypted content;
   sending the non-encrypted content included in the file of print commands from the intermediate device to the printing device;
   determining in the intermediate device if the media content is authorized to be printed;
   decrypting in the intermediate device the media content in encrypted form that corresponds to the media content that is authorized to be printed using a decryption key stored in the intermediate device to produce decrypted media content;
   sending the decrypted media content from the intermediate device to the printing device; and
   printing at the printing device the media content based on the non-encrypted content and decrypted media content received from the intermediate device.

2. The method according to claim 1, wherein the file of print commands includes Printer Control Language commands.

3. The method according to claim 1, wherein the media content includes an image.

4. The method according to claim 1, wherein the media content includes text.

5. The method according to claim 1, wherein determining if the media content is authorized to be printed further comprises:
   determining whether the media content has been previously printed, and wherein it is determined that printing the media content is authorized only if it is determined that the media content has not been previously printed.

6. The method according to claim 1, wherein determining if the media content is authorized to be printed further comprises:
   determining whether the media content has been previously printed less than a predetermined number of times, and wherein it is determined that printing the media content is authorized only if it is determined that the media content has been previously printed less than said predetermined number of times.

7. The method according to claim 1, wherein the file of print commands further includes a digital signature based on the media content in encrypted form using a private key, and wherein determining in the intermediate device if the media content is authorized to be printed further comprises:
   verifying the digital signature using a public key corresponding to the private key, and wherein it is determined that printing the media content is authorized only if the digital signature is verified.

8. The method according to claim 1, further comprising:
   sending the media content in encrypted form from the intermediate device to the printing device for media content that is not authorized to be printed.

9. The method according to claim 1, wherein the media content is an indicium that evidences payment of postage for a mail piece, and before the file of print commands is received at the intermediate device from the computing device the method further comprises:
   downloading from a remote server to the computing device the indicium in encrypted form;
   storing the indicium in encrypted form in the computing device; and
   generating in the computing device the file of print commands for sending to the intermediate device.

10. An electronic decryption device for securely printing media content comprising:
    a first communication port for connection to a computing device, the first communication port for receiving a file of print commands from the computing device, the file of print commands including encrypted media content data representing the media content and non-encrypted commands for printing a printed version of the media content;

a second communication port for connection to a printing device;

a memory device for storing a cryptographic key and a transaction database; and a processing unit coupled to the first and second communication ports and the memory device, the processing unit adapted to send the non-encrypted commands to the printing device via the second communications port, determine if the media content is authorized to be printed utilizing the transaction database stored in the memory device, decrypt the encrypted media content data using the cryptographic key to produce decrypted media content data for media content that is authorized to be printed, and send the decrypted media content to the printing device via the second communication port for printing the media content based on the decrypted media content and non-encrypted commands.

11. The electronic decryption device according to claim 10, wherein the file of print commands includes Printer Control Language commands.

12. The electronic decryption device according to claim 10, wherein the first and second communication ports are each a USB port.

13. The electronic decryption device according to claim 10, wherein the media content includes an image.

14. The electronic decryption device according to claim 10, wherein the media content includes text.

15. The electronic decryption device according to claim 10, wherein the processing unit is adapted to determine whether the media content is authorized to be printed by determining whether the media content has been previously printed based on an entry in the transaction database, and wherein it is determined that printing the media content is authorized only if it is determined that the media content has not been previously printed.

16. The electronic decryption device according to claim 10, wherein the processing unit is adapted to determine whether the media content is authorized to be printed by determining whether the media content has been previously printed less than a predetermined number of times, and wherein it is determined that printing the media content is authorized only if it is determined that the media content has been previously printed less than the predetermined number of times.

17. The electronic decryption device according to claim 10, wherein the file of print commands includes a digital signature, and wherein the processing unit is adapted to determine whether printing the media content is authorized by verifying the digital signature, and wherein it is determined that printing the media content is authorized only if the digital signature is verified.

* * * * *